Feb. 23, 1926.
C. NAGOT
1,573,849
ELASTIC SUSPENSION FOR BICYCLES
Filed Jan. 3, 1925
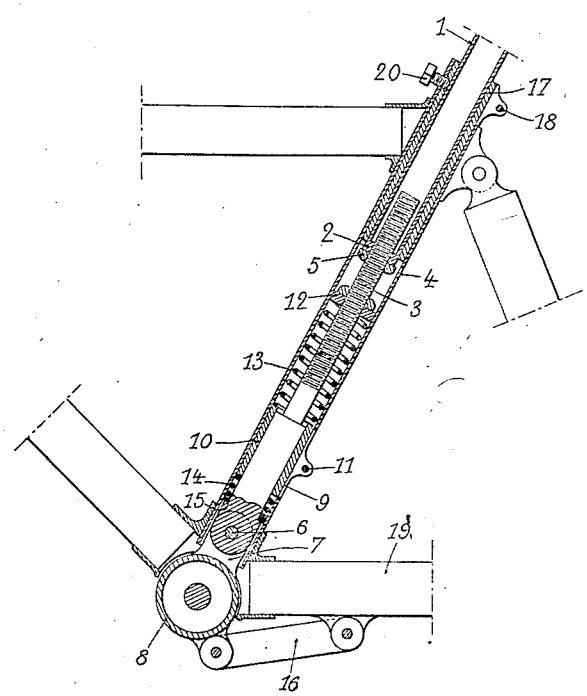
Inventor
C. Nagot
By Marks & Clerk
Attys.

Patented Feb. 23, 1926.

1,573,849

UNITED STATES PATENT OFFICE.

CHARLES NAGOT, OF LA PLAINE ST.-DENIS, FRANCE.

ELASTIC SUSPENSION FOR BICYCLES.

Application filed January 3, 1925. Serial No. 378.

*To all whom it may concern:*

Be it known that I, CHARLES NAGOT, citizen of the French Republic, residing at La Plaine St.-Denis, Seine, in the French Republic, have invented new and useful Improvements in Elastic Suspensions for Bicycles, of which the following is a specification.

The present invention has for its object an elastic suspension for bicycle saddles whereby a greater comfort is afforded to the rider, the desired elasticity being obtained without causing any variation in the distance between the saddle and the pedals.

According to the invention, a rod upon which the saddle is mounted and which is slidable in the saddle frame tube of the bicycle against the action of a spring upwardly urging the said rod, and moreover the crank axle bracket is distinct from the bicycle frame and is pivoted to the lower end of said rod so that said bracket is enabled to follow the vertical motion of the rod.

The appended drawing shows by way of example an embodiment of the invention, the saddle frame tube being shown in longitudinal section.

1 is the saddle tube which is loosely slidable in a socket 17 which is mounted in the split top of the frame tube 4 and is held in place by the bolt 18. The said saddle tube is provided with a screwthreaded plug 2 engaging the end of a rod 3 which is disposed within the tube 4. It is held upon the rod 3 by a lock nut 5 after the height of the saddle has been adjusted.

The lower end of the rod 3 is pivoted by the spindle 6 to a forked member 7 secured to the crank axle bracket 8.

Within another split portion 9 of the tube 4 is secured a socket 10, by means of the bolt 11. Between the upper end of the said socket and the nut 12 engaging the rod 3 is interposed a spring 13 adapted to balance the rider's weight and to serve as an elastic absorber for the shocks due to the unevenness of the road.

In order to obviate all shocks during the ascent of the rod 3, a shorter spring 14 is interposed between the lower end of the socket 10 and the shoulder 15 formed upon the said rod.

For the proper guidance of the crank axle bracket, irrespectively of its spindle 6, said bracket is connected by the links 16 with the lower tubes 19 of the frame. The pivoting points are so chosen that the path described by the centre of the pedal gear when the spindle 6 moves upon the axis of the tube 4, and when the links 16 oscillate, will be substantially a circular arc concentric with the rear wheel of the bicycle, so that the tension of the chain will be independent of the motion of the said suspension arrangement.

For taking the suspension device to pieces, the bolt 11 is loosened and the socket 10 is lowered, together with the rod 3 and the parts attached thereto, in a sufficient manner to afford the release of the spindle 6; the said spindle is then removed and the rod 3 is withdrawn through one end of the tube 4. Should it be desired to hold the said rod in order to render the suspension less elastic, the bolt 20 which is disposed at the top of the tube 4 is then tightened and secures the saddle tube 1 in the socket 17.

Obviously, the details of the construction above described may be modified without departing from the invention and for example the means shown for holding the sockets 10 and 17, or the tube 1, etc., are illustrated merely by way of example.

Having now described my invention, what I claim as new and desire to secure by Letters Patent is:

1. In a bicycle the combination of a rod adapted to slide longitudinally through the saddle frame tube, a socket clamped within said tube, a stop piece on said rod, a spring adapted to balance the rider's weight and supported between said socket and said stop piece and a saddle tube and a movable crank axle bracket respectively carried by the upper end and the lower end of said rod.

2. In a bicycle the combination of a rod adapted to slide longitudinally through the saddle frame tube, a socket clamped within said tube, two stop pieces on said rod on either side of said socket, a suspension spring adapted to balance the rider's weight and a damping spring respectively supported between one end of said socket and the stop piece on the corresponding side and a saddle tube and a movable crank axle bracket respectively carried by the upper end and the lower end of said rod.

3. In a bicycle the combination of a rod adapted to slide longitudinally through and yieldingly supported by the saddle frame tube, a saddle tube carried by the upper end of said rod, a crank axle bracket pivoted to the lower end of said rod and links connecting said crank axle bracket to the lower tubes of the frame.

4. In a bicycle the combination of a rod adapted to slide longitudinally through and yieldingly supported by the saddle frame tube, a saddle tube carried by the upper end of said rod, a crank axle bracket pivoted to the lower end of said rod and links connecting said crank axle bracket to the lower tubes of the frame, the pivoting point of said crank axle bracket upon said rod and the pivoting points of said links being so determined that the centre of the crank axle bracket moves along a path substantially concentric with the rear wheel.

5. In a bicycle the combination of a rod adapted to slide longitudinally through the saddle frame tube, a socket clamped within said tube, a saddle tube and a movable crank axle bracket respectively carried by the upper end and the lower end of said rod and a spring adapted to balance the rider's weight and supported between said socket and the lower end of said saddle tube.

In testimony whereof I have signed my name to this specification.

CHARLES NAGOT.